United States Patent [19]

Calaby et al.

[11] Patent Number: 4,790,621
[45] Date of Patent: Dec. 13, 1988

[54] FIBER OPTIC SWITCH

[75] Inventors: Lauren F. Calaby, Huntington Beach, Calif.; David A. Cooper, Loganton, Pa.

[73] Assignee: GTE Products Corporation, Stamford, Conn.

[21] Appl. No.: 129,502

[22] Filed: Dec. 7, 1987

[51] Int. Cl.$^4$ .............................. G02B 6/36; G02B 6/38
[52] U.S. Cl. ................................................. 350/96.20
[58] Field of Search .............. 350/96.15, 96.20, 96.21, 350/96.22

[56] References Cited

U.S. PATENT DOCUMENTS

| 4,239,331 | 12/1980 | Aoyama | 350/96.20 |
| 4,322,126 | 3/1982 | Minowa et al. | 350/96.20 |
| 4,421,383 | 12/1983 | Carlsen | 350/96.21 |
| 4,589,726 | 5/1986 | Buhrer | 350/96.15 X |
| 4,634,239 | 1/1987 | Buhrer | 350/486 |
| 4,671,613 | 6/1987 | Buhrer | 350/96.15 X |

FOREIGN PATENT DOCUMENTS

| 0013349 | 1/1979 | Japan | 350/96.20 |
| 0176605 | 10/1983 | Japan | 350/96.13 |

Primary Examiner—William L. Sikes
Assistant Examiner—Akm E. Ullah
Attorney, Agent, or Firm—William H. McNeill

[57] ABSTRACT

A 2×2 optical switch employs a six-faced prism which can be moved from a first position to a second position. Mechanical latching means are used to maintain the second position without the necessity of applying continuous power to the moving means which preferably is a solenoid.

3 Claims, 4 Drawing Sheets

FIBER OPTIC SWITCH

TECHNICAL FIELD

This invention relates to fiber optic switches and more particularly to a true 2×2 optical switch.

BACKGROUND ART

As telecommunications increasingly adopts fiber optic transmission, the need for reliable and cost efficient switches increases also. U.S. Pat. Nos. 4,239,331 and 4,322,126 disclose similar mechanical fiber optic switches, although neither is a true 2×2 switch.

DISCLOSURE OF THE INVENTION

It is, therefore, an object of this invention to provide an enhanced fiber optic switch.

It is another object of the invention to provide such a switch having reduced power requirements.

These objects are accomplished, in one aspect of the invention, by the provision of a fiber optic switch which includes a housing having a shuttle mounted prism therein. The shuttle is moved by means contained within the housing and can include latching means whereby a switched position can be maintained without the application of power.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
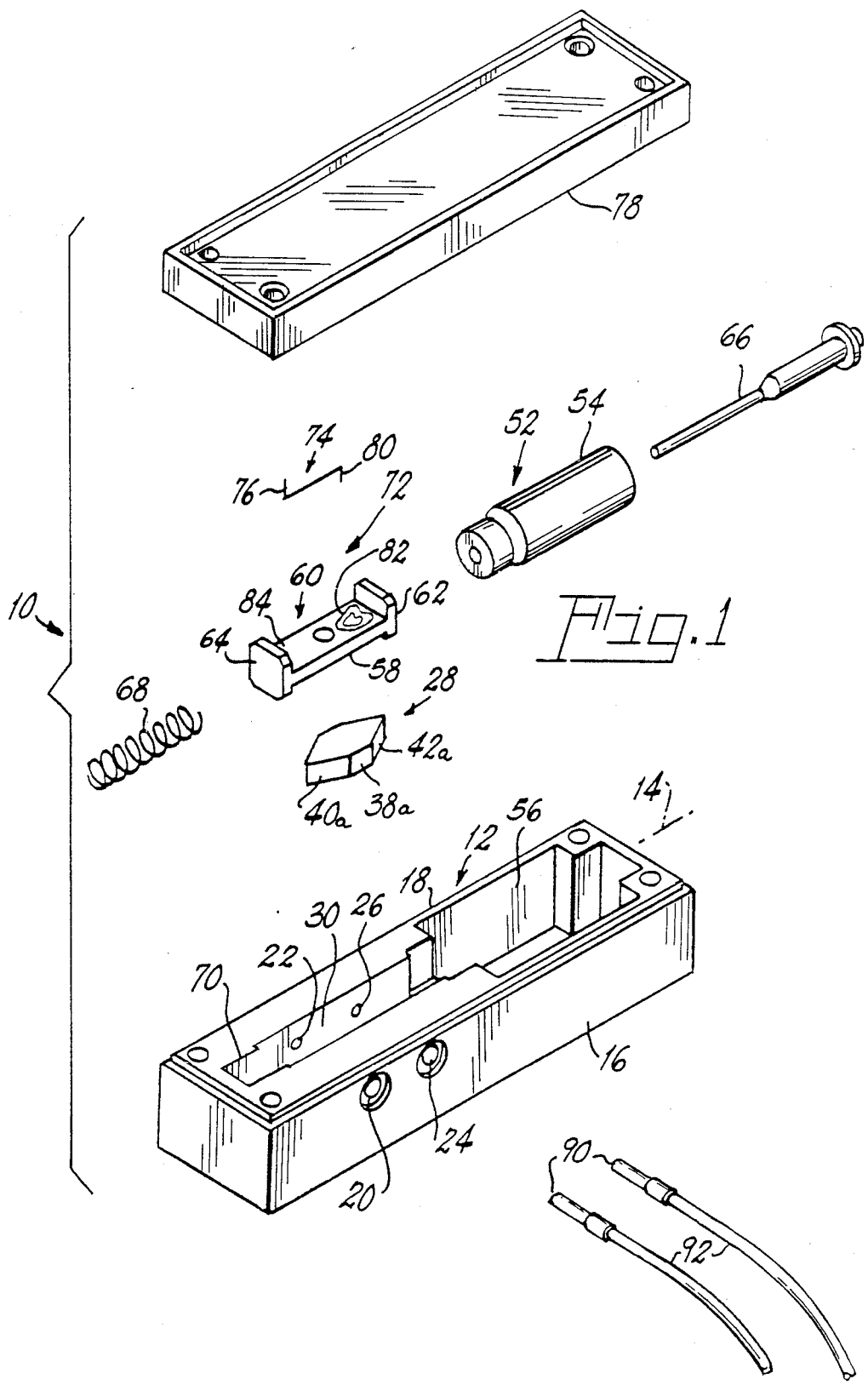
FIG. 1 is an exploded, perspective view of an embodiment of the invention.
Figure 2:
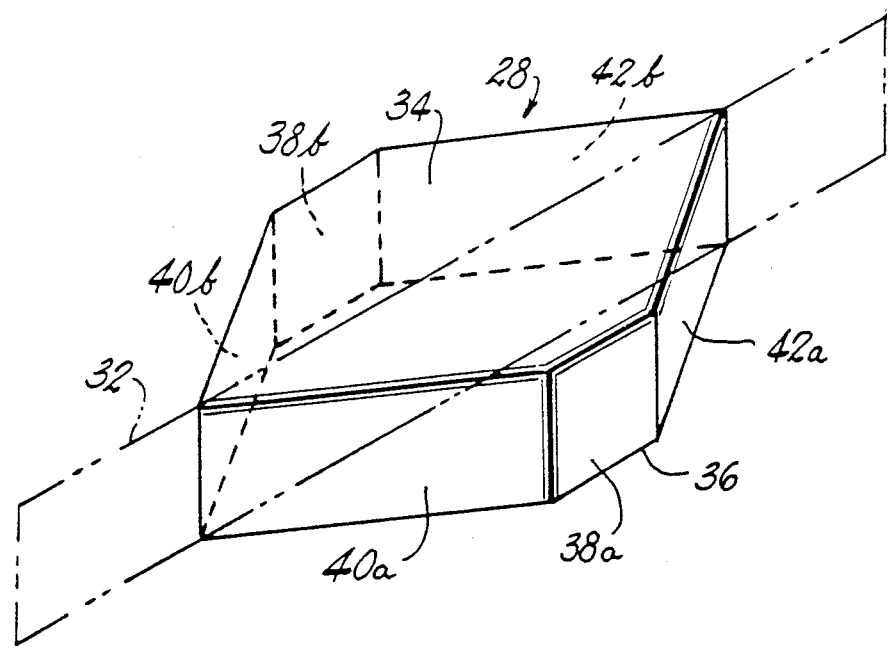
FIG. 2 is an enlarged, perspective view of a prism employed with the invention.
Figure 3:
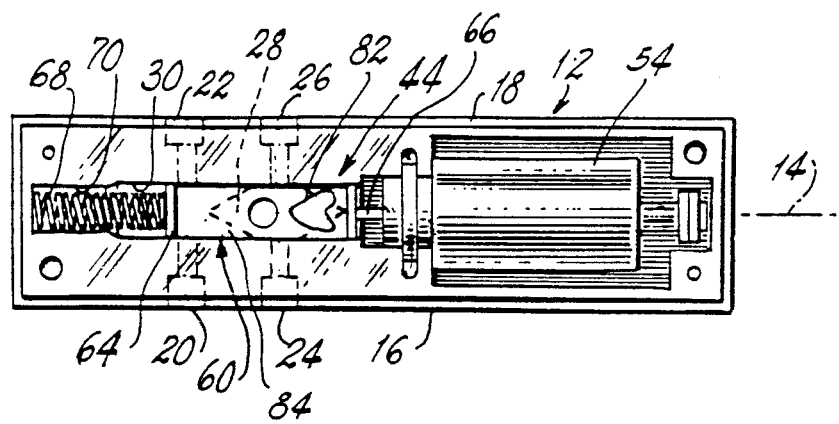
FIG. 3 is a plan view of a switch with the cover removed.
Figure 4:
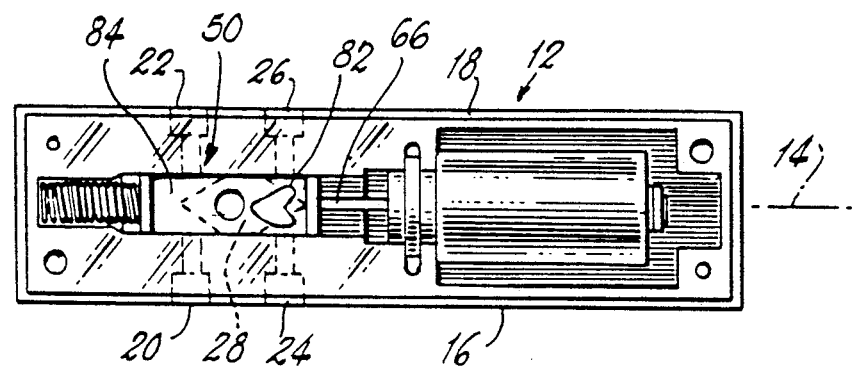
FIG. 4 is a view similar to FIG. 3 in a switched mode.
Figure 5:
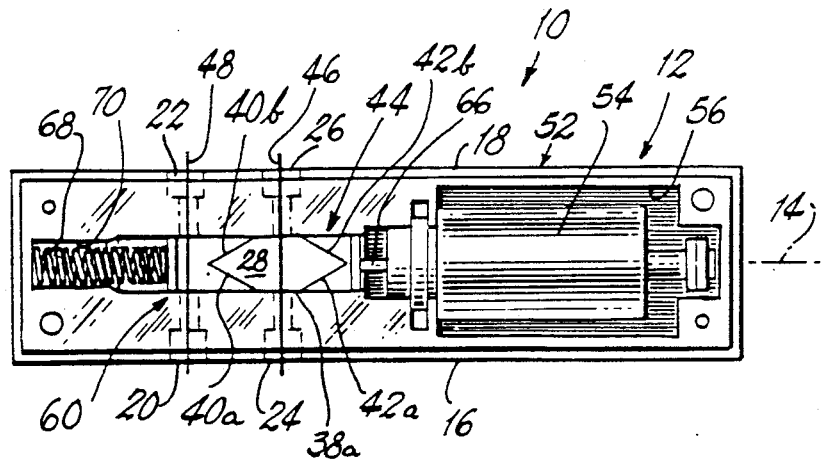
FIGS. 5 and 6 are similar to FIGS. 3 and 4, respectively, illustrating the switching paths.

Referring now to the drawings with greater particularity, there is shown in FIG. 1 a 2×2 optical switch 10 comprising a multi-cavitied housing 12 having a longitudinal axis 14, and spaced apart first and second side walls 16 and 18, respectively, parallel to the longitudinal axis 14. A first optical fiber port 20 is provided in the first side wall 16 and a second optical fiber port 22 is provided in the second side wall 18, diametrically opposed to the first port 20 and in optical axis alignment therewith. A third optical fiber port 24 is provided in the first side wall 16, spaced from and in transverse alignment with the first port 20 and a fourth optical fiber port 26 is provided in the second side wall 18, spaced from and in transverse alignment with the second port 22, diametrically opposed to the third port 24 and in optical axis alignment therewith. A prism 28 is mounted for movement along the longitudinal axis 14 and is positioned in a cavity 30 of housing 12. The prism 28 has a vertical plane of symmetry 32 (see FIG. 2) aligned with the longitudinal axis 14 and has first and second spaced apart, congruent end faces 34, 36, orthogonal to the vertical plane of symmetry. First, second and third pairs of side faces 38a and 38b, 40a and 40b, and 42a and 42b, respectively, are orthogonal to and connect the end faces. The side faces, 38a and b, are positioned between the second and third pairs and are parallel to the vertical plane of symmetry 32 and orthogonal to the optical axes. The prism 28 has a first position 44 (see FIGS. 3 and 5) wherein the side faces 38a and 38b are positioned on an optical axis 46 between the third port 24 and the fourth port 26. In this first position no part of the prism 28 extends on the optical axis 48 between the first port 20 and the second port 22. Prism 28 has a second position 50 (see FIGS. 4 and 6) wherein the side faces, 40a and 40b, are positioned on the optical axis 48 between the first and second ports 20 and 22, and the side faces 42a and 42b are positioned on the optical axis 46 between the third and fourth ports 42a and 42b. Thus, in the first position 44, two input ports (20 and 24) and two output ports (22 and 26) are available and two light beams pass straight through the switch; one from 20 to 22 along axis 48 and one from 24 to 26 along axis 46. The light beam on axis 48 passes only through air while the beam on axis 46 passes through prism 28, as shown in FIG. 5.

Figure 6:
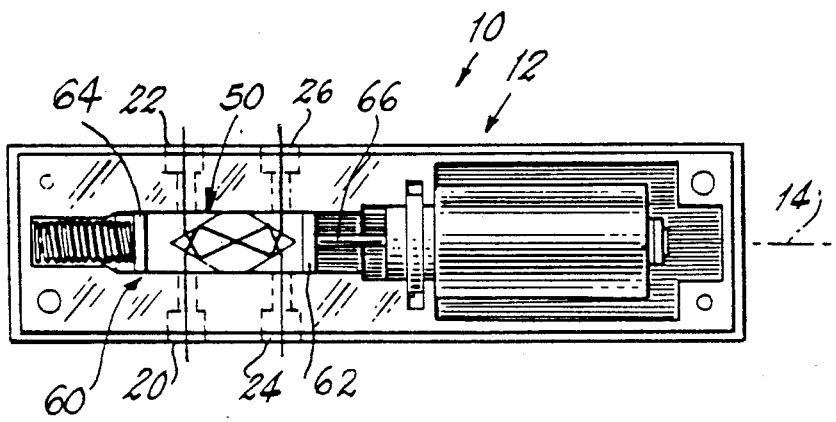

The switched position is shown in FIG. 6 wherein input port 20 is coupled to output port 26 and input port 22 is coupled to output port 24, via the prism 28. Means 52, e.g., a solenoid 54, is provided in a second cavity 56 of the housing 12 for causing prism 28 to move between the first and second positions in response to an appropriate signal.

To insure accuracy of movement, the prism 28 is fixedly mounted upon the underside 58 of a shuttle 60 which has upstanding end portions 62 and 64. It is actually shuttle 60 which moves within cavity 30, its movement being controlled by the armature 6 of solenoid 54 acting against end portion 62 and the opposition of helical spring 68, contained in cavity 70, acting against end portion 64.

Mechanical latching means 72 are provided whereby when shuttle 60 is moved from the first position 44 to the second position 50, the shuttle 60 is maintained in the second position without the continuous application of power to the solenoid 54.

The latching means 72 comprises a spring-like wire member 74 having a first end 76 fixed in a cover 78 and a second end 80 formed as a cam follower which rides in heart-shaped cam track 82 formed in an upper surface 84 of shuttle 60.

Figure 7:
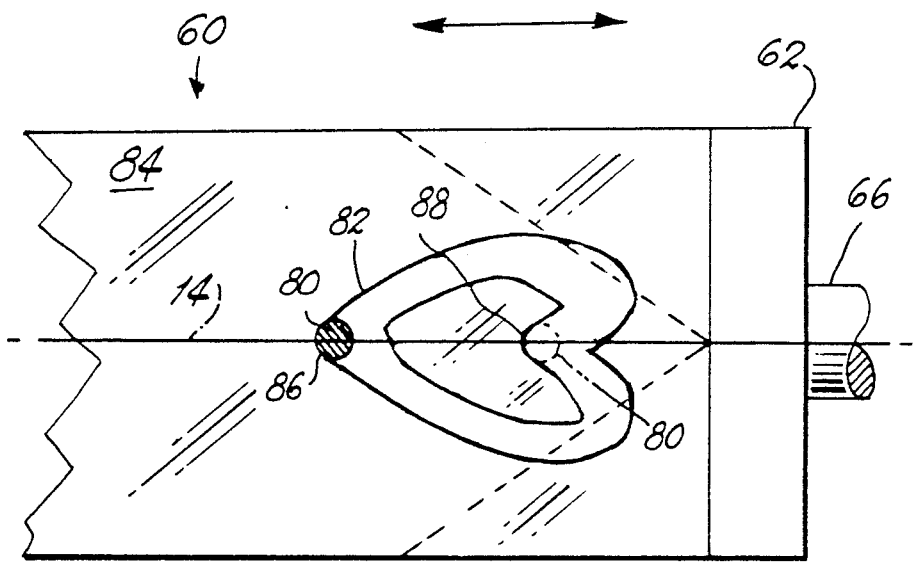
FIG. 7 is a partial, enlarged view of a latching means.

As can be seen most clearly in FIG. 7, when shuttle 60 is in the first position 44, cam follower 80 is positioned at the apex 86 of track 82. Energization of solenoid 54 causes armature 66 to engage end portion 62 and move shuttle 60 to the second position 50, whereat cam follower 80 (shown in phantom) is positioned in bight 88 and held there by the pressure of spring 68.

To return to the first position 44, the solenoid 54 is pulsed to move shuttle 60 farther toward the second position, allowing cam follower 80 to disengage from bight 88 and, by the action of spring 68, return to apex 86, thus completing a switching cycle.

For maximum efficiency, either the ports 20, 22, 24, 26 or the terminal ends 90 of fiber optic cables 92 (only two of which are shown) are provided with lenses, which can be of the type shown in U.S. Pat. No. 4,421,383. The prism 28 is the six-faced prism shown in U.S. Pat. No. 4,634,239.

While there have been shown what are at present considered to be the preferred embodiments of the invention, it will be apparent to those skilled in the art that various changes and modifications can be made herein without departing from the scope of the invention as defined by the appended claims.

We claim:

1. A 2×2 optical switch comprising: a multi-cavitied housing having a longitudinal axis, and spaced apart first and second side walls parallel to said longitudinal axis; a first optical fiber port in said first side wall; a second optical fiber port in said second side wall, diametrically opposed to said first port and in optical axis alignment therewith; a third optical fiber port in said first side wall spaced from and in transverse alignment with said first port; a fourth optical fiber port in said second side wall spaced from and in transverse alignment with said second port, diametrically opposed to said third port and in optical axis alignment therewith; a prism mounted upon a shuttle, said shuttle being mounted for movement along said longitudinal axis positioned in one of said cavities of said housing, said prism having a vertical plane of symmetry aligned with said longitudinal axis and having first and second spaced apart, congruent end faces orthogonal to said vertical plane of symmetry; first, second and third pairs of side faces orthogonal to and connecting said end faces, said first pair of side faces being positioned between said second and third pairs and being parallel to said vertical plane of symmetry and orthogonal to said optical axes; said prism having a first position wherein said first pair of side faces is positioned on the optical axis between said third port and said fourth port, with no part of said prism extending on the optical axis between said first port and said second port; said prism having a second position wherein said second pair of side faces is positioned on the optical axis between said first and second ports and said third pair of side faces is positioned on the optical axis between said third and fourth ports; and means provided in a second cavity of said housing for causing said prism to move between said first and second positions, said means comprises a solenoid; shuttle is moved from said first position to said second position by the application of power to said solenoid and said housing includes mechanical latching means cooperating with said shuttle to maintain said shuttle in said second position upon removal of said power from said solenoid.

2. The switch of claim 1 wherein said housing is parallelepipedonal.

3. The switch of claim 1 wherein each of said fiber optic ports includes a lens having an optical fiber associated therewith.

* * * * *